(12) United States Patent
Abel et al.

(10) Patent No.: US 8,201,838 B2
(45) Date of Patent: Jun. 19, 2012

(54) SCOOTER

(75) Inventors: Helmut Abel, Maison-Laffitte (FR);
Diane Abel, Maison-Laffitte (FR);
Céline Abel, Maison-Laffitte (FR)

(73) Assignee: Helmut Abel, Maison-Laffitte (FR)

( * ) Notice: Subject to any disclaimer, the term of this patent is extended or adjusted under 35 U.S.C. 154(b) by 227 days.

(21) Appl. No.: 12/650,165

(22) Filed: Dec. 30, 2009

(65) Prior Publication Data
US 2010/0164193 A1 Jul. 1, 2010

(30) Foreign Application Priority Data

Dec. 30, 2008 (DE) .................. 10 2008 063 258

(51) Int. Cl.
*B62M 1/00* (2010.01)
(52) U.S. Cl. ............... 280/87.041; 280/87.05; 280/62
(58) Field of Classification Search .. 280/87.01–87.051, 280/11.19, 62
See application file for complete search history.

(56) References Cited

U.S. PATENT DOCUMENTS

| | | | | |
|---|---|---|---|---|
| 1,637,129 A * | 7/1927 | Pritchett | ............ | 280/87.041 |
| 1,674,272 A * | 6/1928 | Zander | ............ | 280/87.041 |
| 2,077,274 A * | 4/1937 | Silkman | ............ | 280/87.041 |
| 3,059,943 A * | 10/1962 | Rich | ............ | 280/87.021 |
| 3,089,709 A * | 5/1963 | De Vos | ............ | 280/87.05 |
| 4,323,258 A * | 4/1982 | Culpeper | ............ | 280/7.12 |
| 4,540,192 A * | 9/1985 | Shelton | ............ | 280/282 |
| 4,776,604 A * | 10/1988 | Valdez et al. | ............ | 280/87.041 |
| 5,039,121 A * | 8/1991 | Holter | ............ | 280/220 |
| 5,620,189 A * | 4/1997 | Hinderhofer | ............ | 280/5.24 |
| 5,785,331 A * | 7/1998 | Rappaport | ............ | 280/87.041 |
| 6,554,302 B1 | 4/2003 | Liu | | |
| 7,134,677 B2 * | 11/2006 | Opsvik | ............ | 280/87.041 |
| 7,287,767 B1 * | 10/2007 | Gomes et al. | ............ | 280/87.021 |
| 7,322,434 B1 * | 1/2008 | Hussain | ............ | 180/180 |
| 7,926,825 B2 * | 4/2011 | Chen | ............ | 280/87.043 |
| 7,938,413 B2 * | 5/2011 | Anderson | ............ | 280/87.021 |
| 2003/0052471 A1 * | 3/2003 | Grafton | ............ | 280/282 |
| 2010/0096823 A1 * | 4/2010 | Stillinger et al. | ............ | 280/87.021 |

FOREIGN PATENT DOCUMENTS

DE 4410304 11/1995

* cited by examiner

*Primary Examiner* — Katy M Ebner
(74) *Attorney, Agent, or Firm* — Akerman Senterfitt; Peter A. Chiabotti

(57) ABSTRACT

A scooter having an approximately U-shaped frame between the arms and of which, a footboard is provided. The free space between footboard and the arms is big enough that sufficient room is left for the pushing foot. At the rear ends of the frame arms, the wheels are mounted while the steering bar with the steering wheel is provided at the front end of the frame.

12 Claims, 4 Drawing Sheets

SCOOTER

FIELD OF THE DISCLOSURE

The present disclosure relates generally to scooters.

BACKGROUND

A scooter is to be understood as muscular-driven, generally a two-wheeled small vehicle, comprising a near-ground footboard on which a person can stand while moving. Here, the person stands with one foot on the footboard while the scooter is driven by pushing movements of the other foot, the pushing foot. Scooters of this kind are known in great quantities.

Further, scooters are offered on the market in the form of children's tricycles comprising a standing platform, whereby the two rear wheels of the scooter are mounted on a common rigid axle.

The standing platform, hence the footboard, is arranged in most cases above this axle, or above and right behind this axle. The disadvantage of these vehicles is that the pushing foot, with the standing foot placed onto the platform, cannot reach the roadway unhindered and effectively because the through-running wheel axle and the platform, as well as the frequently upwards projecting wheels, are interfering so that only small, short-stroke pushing movements of the pushing foot are possible with small effect.

From U.S. Pat. No. 6,554,302 B1 a tricycle is known which is driven forward either by pivoting movements of the body, whereby then both feet of the user rest on small footboards, or the pushing foot can carry out long-stroke foot movements within a free space provided for the pushing foot between an approximately U-shaped frame and the two rear wheels.

For this vehicle as well, an approximately vertically standing steering bar is provided, which is mounted in a bearing bush attached at the front end of the vehicle, and on which the front steering wheel is mounted by means of a fork. The frame of this vehicle has two arms which extend parallel to each other in driving direction and on the rear ends of which, non-steerable wheels are mounted. In the front and the outer area, each of these arms carries a narrow footboard which serves for the reception of the standing foot. The free space between the two outer footboards attached on the arms allows the pushing movements of the pushing foot.

However, this vehicle, which is brought on the market also as an industrial scooter, has the following disadvantages.

During pushing with the pushing foot, the standing foot is placed on one of the two off-centered footboards, thereby causing that the body weight of the driver acts with each pushing process substantially on the outer area, whereby the naturally turbulent pushing process results in an unstable position with the danger of tipping over.

The danger increases when the little-loaded other rear wheel runs over a projecting obstacle, e.g., an elevation of the ground, which can result in that the vehicle upsets sideward.

A further disadvantage is that the driver, during each pushing process, does not stand centered in front of the steering bar with the steering wheel, but laterally thereto so that he has to hold the steering bar comprising break levers attached thereon with laterally offset hands, or he has to bend towards the middle of the steering bar and needs to be supported on the steering bar. Here, it is difficult to precisely guide the steering bar, whereby the driver has to keep a quite uncomfortable and tiring position. Once the driver has reached a certain driving speed with the vehicle after multiple pushing processes, he will put the pushing foot onto the opposite narrow footboard to take a more comfortable position which is less tiring. For this purpose he has to move the pushing foot far outwards and has to place the same precisely onto the narrow footboard. Apart from this process requiring considerable body control, it results furthermore in an unaesthetic, bowlegged, and uncomfortable and unsafe position.

SUMMARY

The present invention is based on the object to improve such a vehicle comprising structures for avoiding the described disadvantages. This object is resolved in that the footboard serving for the reception of the standing foot of the driver is arranged centered between the two arms of the frame, and in that the distance between each of the arms and the lateral edge of the footboard corresponds to at least the width of the pushing foot of the driver.

In case of such a scooter, the pushing foot moves either left or right from the standing foot resting on the footboard, and within the free space between the footboard and the frame arm.

During all driving phases, hence when accelerating, freewheeling, and when the driver gets off, such a scooter stays completely stable against tilting because the driver is always standing centered on the footboard and central in front of the steering bar in a normal, comfortable, and safe upright position. He can drive the scooter forward, comfortable and without stress, and can steer precisely without carrying out acrobatic movements and without having to take an inclined body position. Hence, he can focus completely on driving and the environment. In a normal and upright body position, the pushing foot generating the thrust force for the forward drive can reach the roadway surface completely unhindered, unproblematic, and very effectively. In particular, the pushing foot can freely carry out long-stroke pushing movements. The body weight of the driver remains ideally distributed over the three wheels during all driving phases. Since, in addition, the two rear wheels are equally loaded during all driving phases, there is no danger of tipping over.

Also the means of transportation described in DE 44 10 304 A1, in case of which a continuous footboard is provided between the two arms, does not eliminate the described disadvantages because between the respective arm and the lateral edge of the footboard, no free space is available in which the pushing foot would fit.

Finally, in addition, the construction according to the invention allows an extremely short and hence very compact structure.

To increase the stability of the U-shaped frame, one embodiment provides stabilization rod parallel to the yoke connecting the two frame arms, and to attach the footboard with its front end to the yoke and the stabilization rod.

This is particularly advantageous when, as proposed in claim 4, the food board consists of elastically flexible material, preferably steel, in particular spring steel, or a suitable plastic. By means of such a footboard, shocks generated at driving over uneven ground can be dampened for the protection of the driver.

To be able to adjust the scooter to the individual requirements of the driver, the footboard can be advantageously tapered rearwards, is designed laterally moveable and/or height-adjustable. Thereby, the free space between frame arm and footboard can be varied according to the wishes and needs of the driver.

In its simplest from, the scooter has only one front steering wheel.

If a higher stability is desired to provide at the steering bar two coaxial steering wheels arranged within a small distance from each other.

BRIEF DESCRIPTION OF THE DRAWINGS

Apart from that, further features of the invention are explained individually hereafter by means of preferred exemplary embodiments which are illustrated in the drawings. In the drawings.

Figure 1:
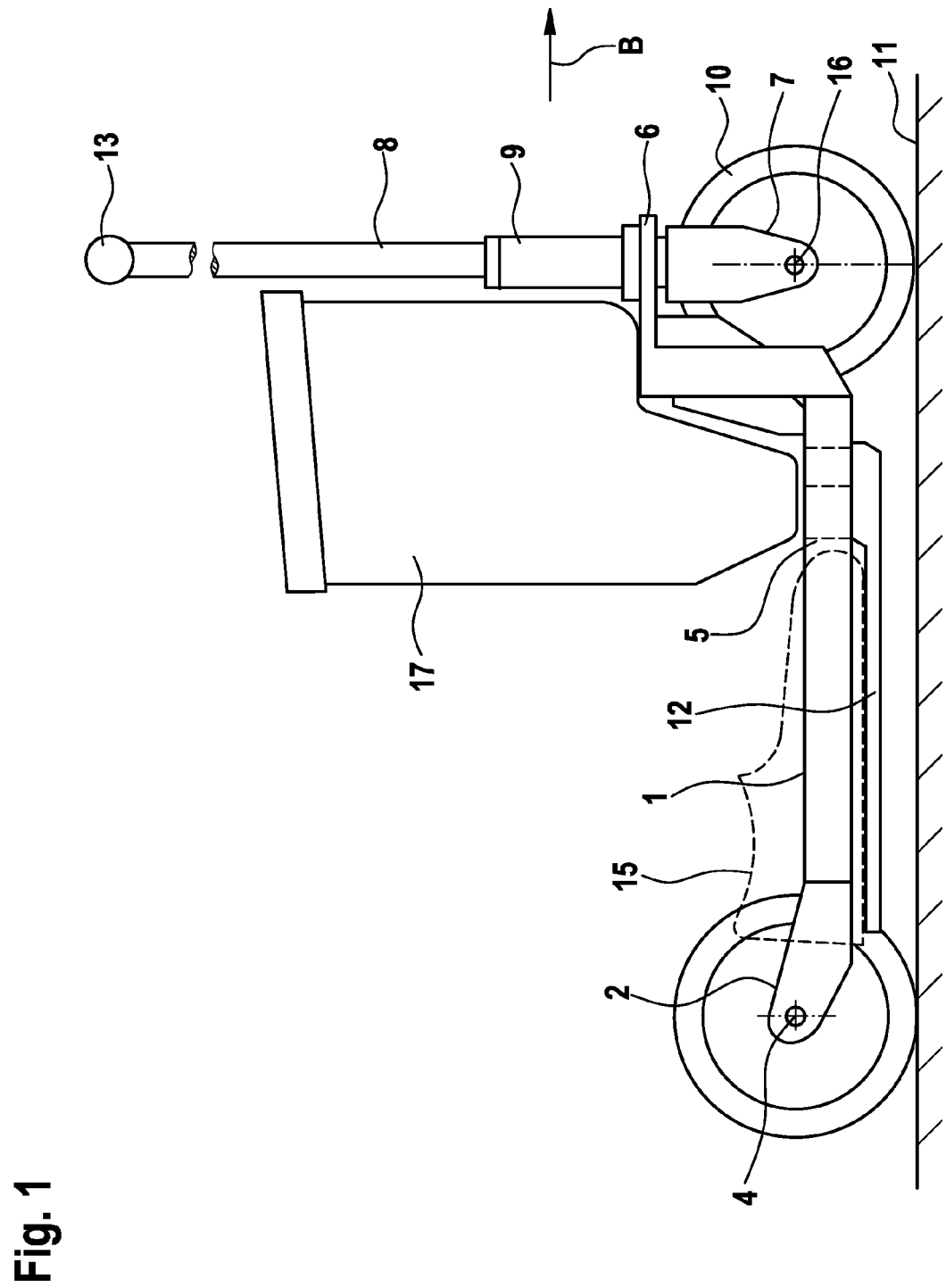
FIG. 1 shows a side view of a scooter according to the invention according to a first exemplary embodiment.

In the drawings, the scooter according to the invention is shown in the form of a three-wheeled vehicle.

DETAILED DESCRIPTION OF THE ILLUSTRATED EMBODIMENTS

The scooter consists substantially of a vehicle frame 1 at which, on its front end, the steering bar 8 with steering wheel 10, and on its rear end, two wheels 3 are rotatably mounted, wherein the near-ground footboard 12 serving as a platform is arranged centered behind the steering bar 8 between the two arms 1a and 1b of the frame 1.

The substantially U-shaped frame 1 with its both-sided arms 1a and 1b and with yoke 1c connecting the same consists in the illustrated exemplary embodiment of welded pipes with rectangular profile. However, it can also be designed as a continuous, U-shaped bow made from a round pipe.

At the rear ends of the frame 1a and 1b, wheel forks 2 are provided, each of them receiving a rear wheel 3 with its rear wheel axle 4. In a not-shown exemplary embodiment, the wheel fork is abandoned, wherein the wheel is mounted at the end of the frame arm on a cantilever axle.

The U-shaped frame 1 is reinforced by means of a stabilization rod 5 which extends parallel to the yoke 1c connecting the frame arms 1a and 1b. In a side view, on yoke 1c, an L-Shaped beam 6 is attached which carries the cylindrical bearing 9 for the steering rod 8.

The frame 1, which is oriented approximately parallel to the roadway 11, and which opens widely rearwards with its arms 1a and 1b, carries in its center the footboard 12, which is fixedly connected only at its front end with the stabilization rod 5 and the yoke 1c.

The footboard 12, which is tapered rearwards, runs in a short distance approximately parallel to the roadway 11, preferably at a distance of 25 mm.

Figure 2:
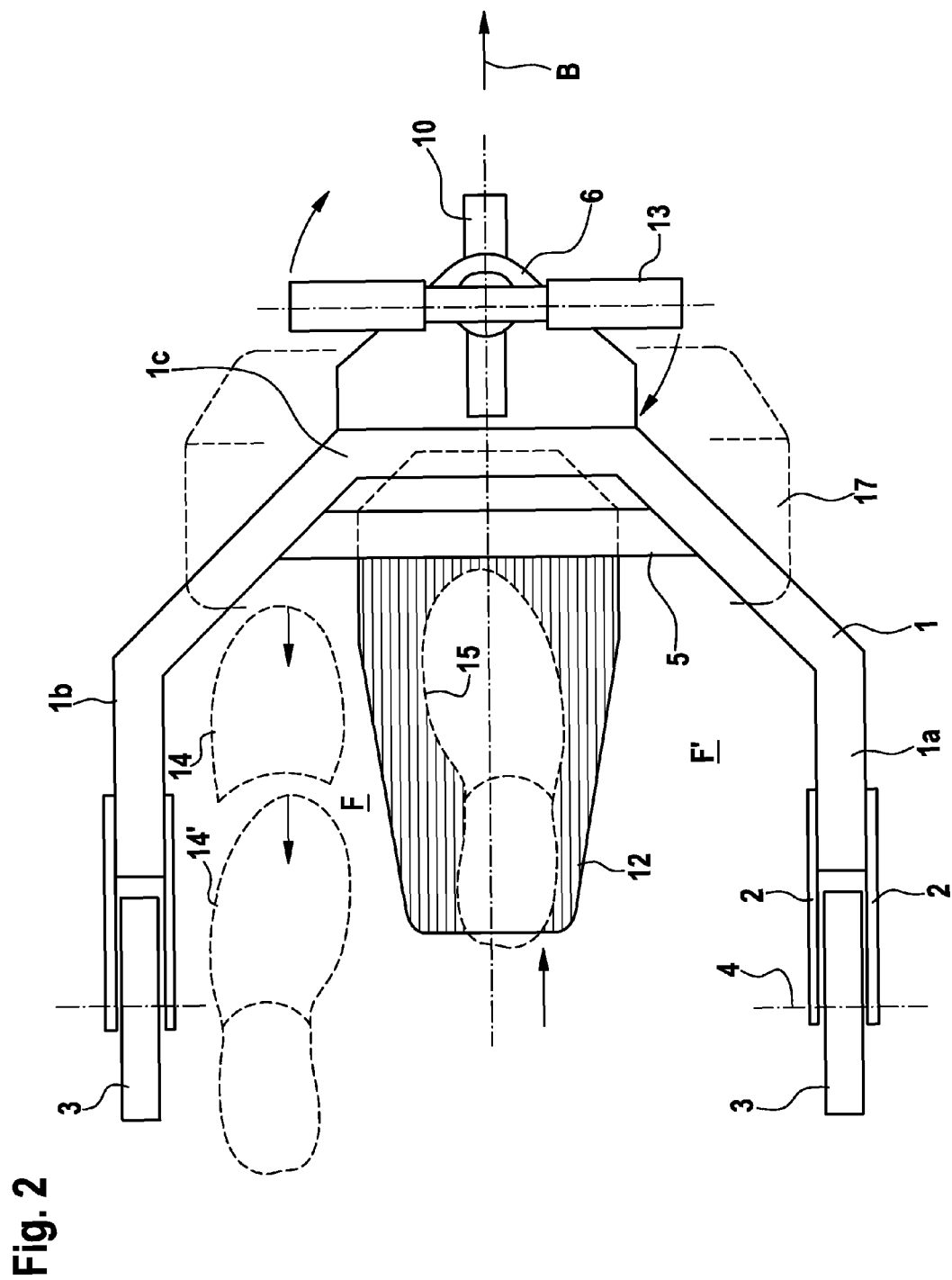
FIG. 2 shows a top view of the scooter according to FIG. 1.

The footboard 12 and the frame 1 are dimensioned in such a manner that on both sides of the footboard 12 free spaces F and F' are generated which are dimensioned in such a manner that the pushing foot 14 can carry out long-stroke pushing movements without interfering while the standing foot 15 rests on the footboard 12. As shown in FIG. 2, the width of the free spaces F and F' between the footboard 12 and frame arms 1a and 1b increases as the footboard tapers from its front end towards its rear end. The angle of tapering relative to a lengthwise axis of the footboard can be between approximately 8 degrees and 12 degrees, and 10 degrees in one arrangement. At the approximate midpoint (ML) of the length (L) of the footboard 12, the width of the free spaces F and F' is at least the same distance as the width of the footboard 12. This distance of the width of the free spaces F and F' and the width of the footboard at its approximate lengthwise midpoint can be approximately 150 mm to 190 mm, and 170 mm in one arrangement. The width of the free spaces F and F' increase as the footboard 12 tapers towards its rear end and slightly decrease as the footboard tapers outward towards its front end. Nevertheless, at the front end of the footboard 12 where the outward tapering of the footboard 12 ceases, the width of the free spaces F and F' can be greater than the width of the footboard 12 at its rear end. Here, the width of the free spaces F and F' can be approximately 1.4 times greater than the width of the footboard 12 at its rear end. Likewise, the width of the free spaces F and F' at the rear end of the footboard 12 is greater than the width of the rear end of the footboard 12 to a more substantial extent. Here, the width of free spaces F and F' can be approximately 1.6 times greater than the width of the rear end of the footboard 12. Thus, the width of the free spaces F and F' can increase from 1.0 times the width of the rear end of the footboard 12 to 1.6 times the width of the footboard 12 as the footboard 12 tapers inward from its front end to its rear end. Accordingly, the free spaces F and F', relative to frame arms 1a and 1b, are dimensioned to allow user's foot to be placed between the footboard 12 and frame arms 1a and 1b along substantially the entire length of footboard 12 as shown in FIG. 2.

For usage, for example, the driver steps with his right foot 15 on the central, low footboard 12, whereby he stands centered in front of the steering bar, hence not laterally offset, whereupon he can grab the handlebar 13 in a comfortable position. With his left foot he can carry out relatively long-stroked pushing movements within the free space F, as indicated by the contours 14 and 14'. Also during pushing off, hence during the acceleration phase, as well as during full speed, the scooter remains completely stable against tipping over. This is achieved in that the rear wheels 3 are spaced apart widely, and the body weight of the driver is distributed evenly to a large extent over the front steering wheel 10 and the two rear wheels 3.

Furthermore, in case of an emergency, the driver can jump off easily and quickly from the footboard 12.

If the driver prefers to use a certain foot for pushing off, e.g., the left one, the footboard 12 can be arranged transversely movable at the frame 1 to increase thereby, e.g., the free space F at the expense of the free space F'.

In a further variant, not shown, the scooter comprises two front steering wheels instead of one, so that an even safer vehicle is created, namely a four-wheeled vehicle.

As shown in the drawings, the scooter according to the invention can be equipped with a removable transportation container 17 for goods which is supported on the frame 1 and/or on the beam 6, and which is located advantageously between the wheel axles 4 and 16, whereupon a good weight distribution is achieved. This arrangement is stable enough that relatively big and heavy objects, even small children, can be transported riskless, fast, and safer than with a bicycle or a conventional two-wheel scooter.

Figure 3:
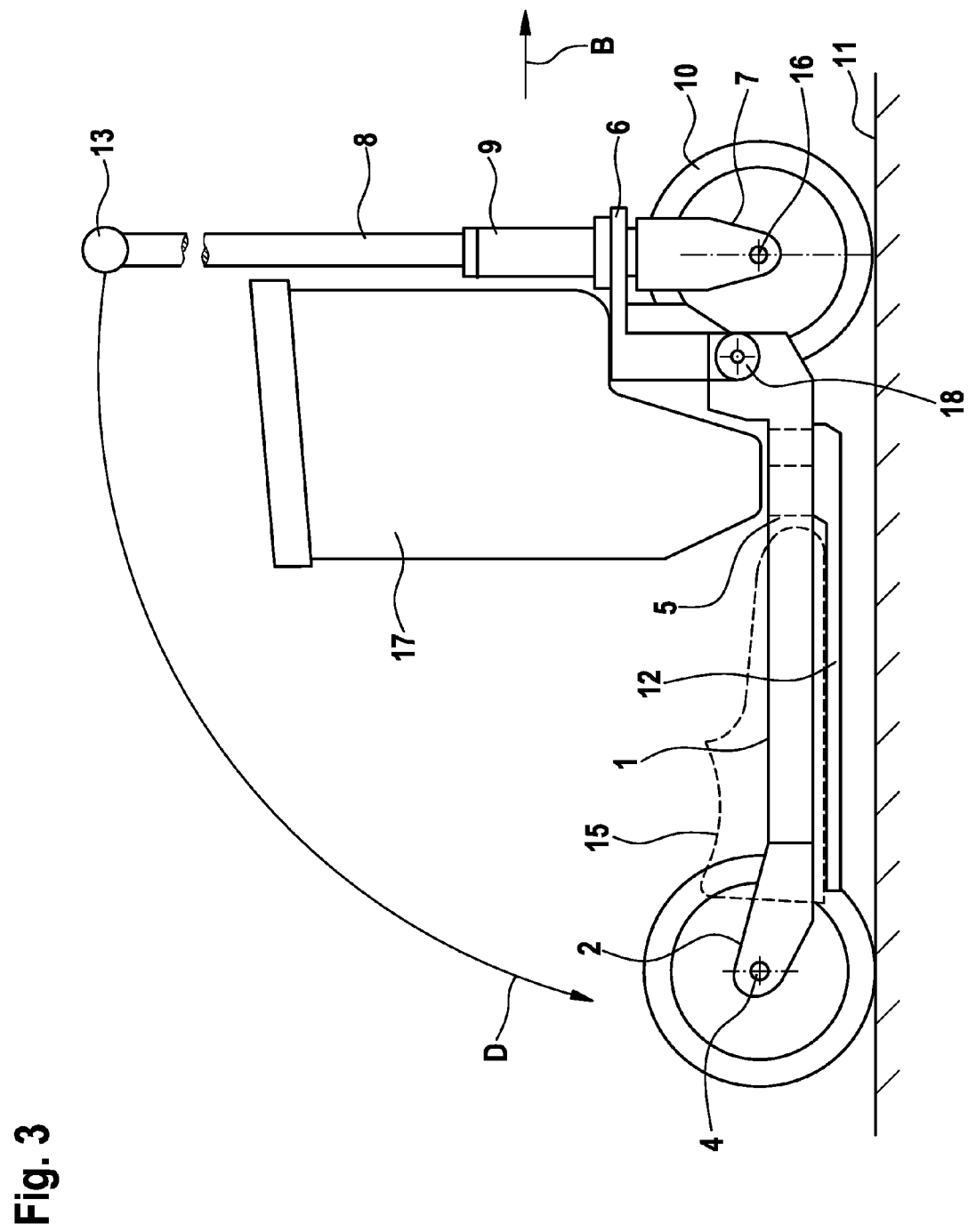
FIG. 3 shows a side view of a scooter according to the invention according to a second exemplary embodiment.

In the exemplary embodiment illustrated in FIG. 3, the beam 6 receiving the steering bar 8 is pivotably mounted at the frame by means of the pivot axle 18. After removing the transportation container 17 for goods, for transport and storage purposes, the steering bar 8 with front wheel 10 can be tilted backwards in direction D by approximately 90°. In usage position as well as in storage position, the beam 6 is lockable in a not-shown manner.

Figure 4:
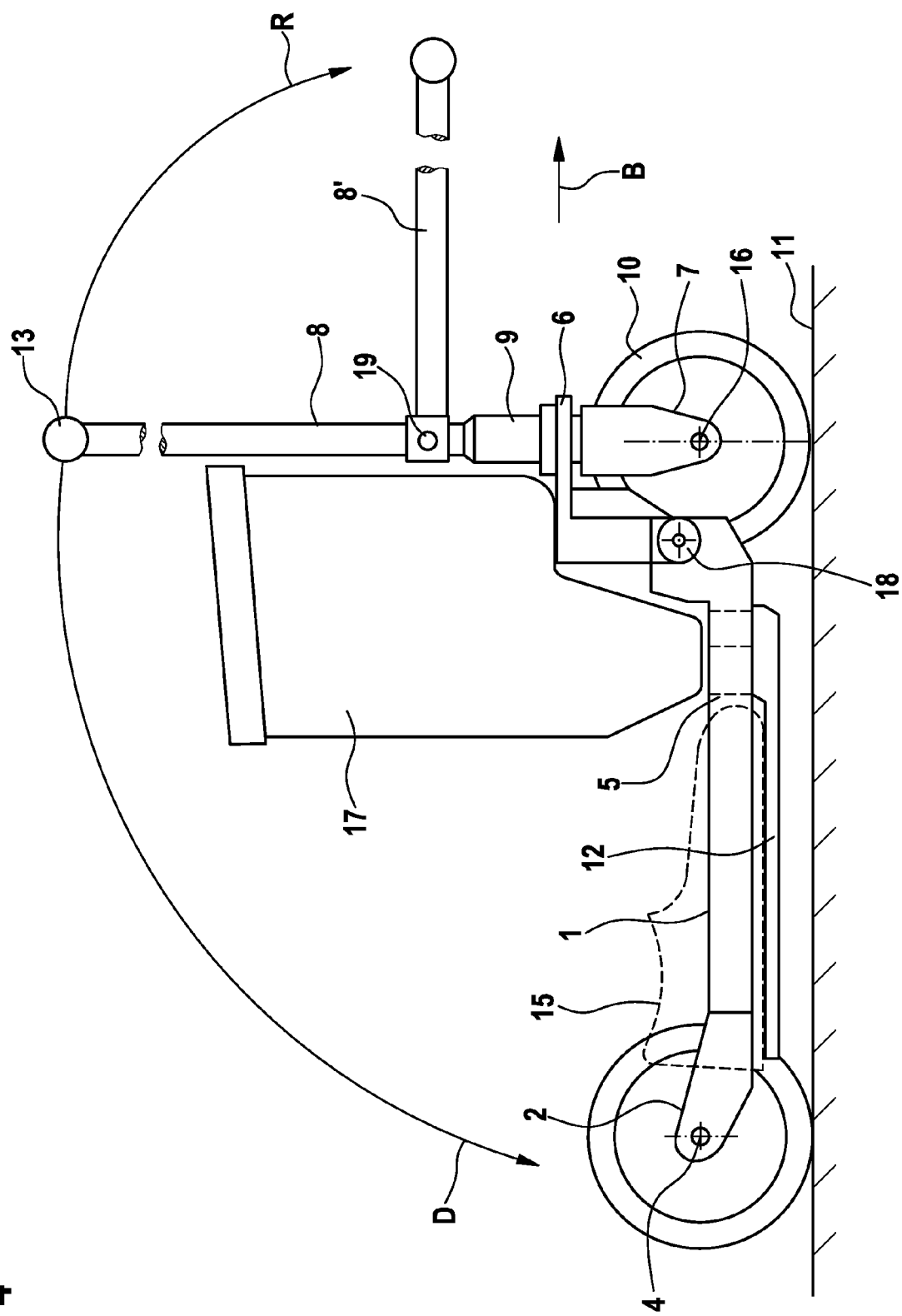
FIG. 4 shows a side view of a scooter according to the invention according to a third exemplary embodiment.

In the exemplary embodiment illustrated in FIG. 4, the steering bar 8' can be folded forward in direction of the arrow R about a pivot axle 19 provided above the bearing 9. The steering bar 8' is then oriented approximately parallel to the roadway 11 and forms in this position a drawbar by means of which the scooter can be pulled in a very comfortable manner In this case, transportation goods placed on the frame, e.g., wide and heavy boxes, can be transported with the scooter. The scooter can also be used as a stroller to be pulled, whereby the child can be put standing upright into the transportation container 17 for goods or can be laid down flat. In the standing position, the child can grip the upper edge of the transportation container 17 for goods positioned on the platform 12.

Reference List
1 Frame
1a, 1b Frame arms
1c Yoke
2 Wheel fork
3 Wheel
4 Rear wheel axle
5 Stabilization rod
6 Beam
7 Wheel fork
8, 8' Steering bar
9 Bearing
10 Front steering wheel
11 Roadway
12 Footboard
13 Handlebar
14, 14' Pushing foot
15 Standing foot
16 Front wheel axle
17 Transportation container for goods
18 Pivot axle
19 Pivot axle
F, F' Free space
B Driving direction for forward drive
D Tilt direction for rearward tiltable steering bar
R Tilt direction for forward tiltable steering bar

The invention claimed is:

1. A scooter with:
a frame having a front portion and two arms extending parallel to each other rearwardly in a driving direction from the front portion, each arm having a rear wheel rotatably mounted thereon at an end of the arm;
a steering bar with at least one steering wheel mounted to the frame at the front portion thereof; and
a near-ground footboard attached to the frame only at a front end thereof to the front portion of the frame and centered between the arms of the frame substantially in alignment with the steering bar, the footboard being adapted to receive a standing foot of the driver,
wherein the frame is open at its rear in a driving direction and the distance between each arm and lateral edges of the footboard corresponds to at least the width of a pushing foot of the driver such that the driver can freely carry out long-stroke pushing movements by placing either foot on the ground between the footboard and each arm of the frame.

2. The scooter according to claim 1, wherein the frame comprises at its front end a cylindrical bearing for the steering bar;
the frame arms comprise at their rear ends wheel forks for the rear wheels; and
the steering bar comprises a wheel fork for the steering wheel.

3. The scooter according to claim 1, wherein the frame arms are connected at their front ends by means of a yoke forming said front portion, wherein running parallel to the yoke, a stabilization rod is provided, and wherein the front end of the footboard is attached to the yoke and the stabilization rod.

4. The scooter according to claim 3, wherein the footboard consists of elastically resilient material.

5. The scooter according to claim 1, wherein the footboard is tapered rearward.

6. The scooter according to claim 1, wherein the footboard is laterally movable and/or height adjustable.

7. The scooter according to claim 1, wherein at the steering bar, two coaxial steering wheels are provided which are arranged at a short distance from each other.

8. The scooter according to claim 1, wherein a transportation container for goods is removably attached at the frame and/or at a beam connecting the steering bar with the frame.

9. The scooter according to claim 1, wherein the steering bar can be tilted backward and/or forward for transport purposes about a pivot axle extending transversely to the center axis of the footboard, and can be locked in a driving position as well as in a transport position.

10. The scooter according to claim 1,
wherein the frame comprises at its front end a cylindrical bearing for the steering bar;
wherein the frame arms comprise at their rear ends wheel forks for the rear wheels;
wherein the steering bar comprises a wheel fork for the steering wheel; and
wherein the steering bar can be tilted backward and/or forward for transport purposes about a pivot axle extending transversely to the center axis of the footboard, and can be locked in a driving position as well as in a transport position.

11. The scooter according to claim 10, wherein the frame arms are connected at their front ends by means of a yoke, wherein running parallel to the yoke, a stabilization rod is provided, and wherein the footboard is attached with its front end to the yoke and the stabilization rod.

12. The scooter according to claim 4, wherein the footboard is formed of steel or plastic.

* * * * *